United States Patent [19]

Boeckman et al.

[11] Patent Number: 4,482,128

[45] Date of Patent: Nov. 13, 1984

[54] HIGH PRESSURE CAM SEAL VALVE

[75] Inventors: Paul A. Boeckman, Glenpool; Dennis L. Young, Tulsa, both of Okla.

[73] Assignee: Dover Corporation, Tulsa, Okla.

[21] Appl. No.: 519,032

[22] Filed: Aug. 1, 1983

Related U.S. Application Data

[63] Continuation-in-part of Ser. No. 494,504, Mar. 11, 1983, Pat. No. 3,627,259.

[51] Int. Cl.³ .............................................. F16K 25/00
[52] U.S. Cl. ..................................... 251/163; 251/308
[58] Field of Search ......................... 251/162, 163, 308

[56] References Cited

U.S. PATENT DOCUMENTS 3,627,259 12/1971 Williams .............................. 251/163
3,854,696 12/1974 Keyes .................................. 251/163

*Primary Examiner*—Harold W. Weakley
*Attorney, Agent, or Firm*—Head, Johnson & Stevenson

[57] ABSTRACT

A valve formed of a body, adapted to be clamped between flanges in a pipeline, having a flow passageway therethrough defining an annular valve seat, a valve disc assembly positioned in the flow passageway and movable between a closed and an open position, the disc having a peripheral sealing surface which engages the valve seat when the valve is closed and is turned 90 degrees so that its plane is parallel to the axis of the flow passageway, when it is open. A valve stem is provided and means for axially moving the valve stem through two coaxial valve stem openings in the body. Two cam systems are provided on the valve stem. The first serves to move the valve towards or away from the valve seat as the stem moves axially. The second serves to turn the valve stem through an angle of 90 degrees due to further axial motion of the stem. The valve disc assembly is supported on the valve stem such that it can be moved in a direction perpendicular to the axis of the stem, but cannot rotate with respect to the stem.

6 Claims, 13 Drawing Figures

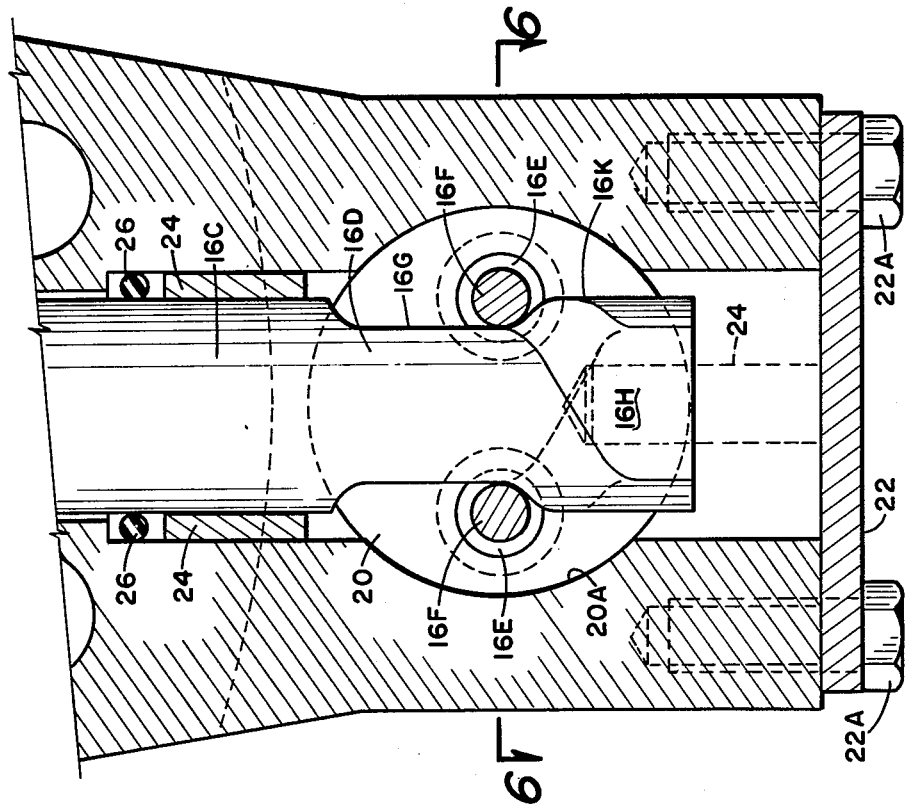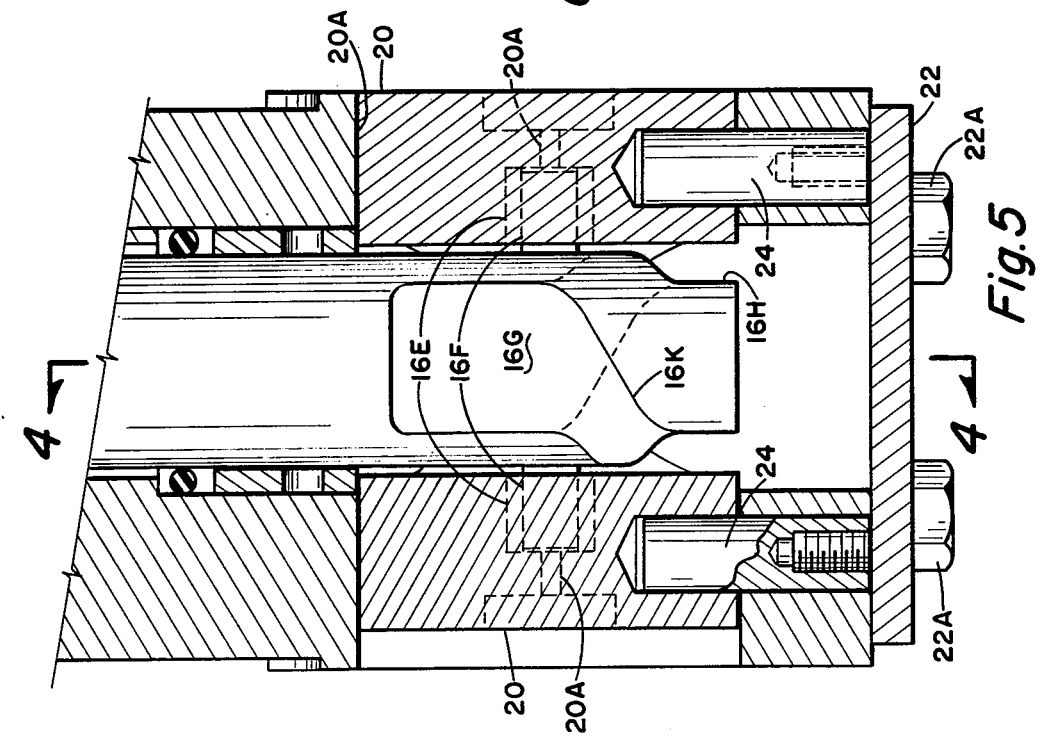

HIGH PRESSURE CAM SEAL VALVE

CROSS-REFERENCE TO RELATED PATENT AND APPLICATION

This invention is related to U.S. Pat. No. 3,627,259 which was issued Dec. 14, 1971 in the name of George C. Williams and entitled: "CAM SEAL BUTTERFLY VALVE".

This application is a continuation-in-part of Applicants' copending application, Ser. No. 494,504, filed Mar. 11, 1983, entitled: "HIGH PRESSURE CAM SEAL VALVE", and now U.S Pat. No. 3,627,259 is inserted by reference into this application.

BACKGROUND OF THE INVENTION

1. Field of the Invention

This invention lies in the field of fluid flow control valves. More particularly, it is of the type of so-called butterfly valves which are relatively thin in the direction of the flow axis and can be inserted between flanges in a pipeline, whereby the bolts which hold the flanges pass through the body of the valve and clamp it securely and sealably between the flanges.

2. Description of the Prior Art

In the prior art there are a number of patents and other publications describing butterfly type valves for use in the chemical and petroleum industry. Most of these provide an annular valve seat and a valve disc which is supported by the valve stem. The plane of the valve disc is at a selected fixed distance from the axis of the valve stem. The forward face of the disc which seals against the valve seat is usually spherical so that just by turning the valve stem the disc will be rotated from a first position where its plane is in the flow axis to a second position where its plane is perpendicular to the flow axis and its spherical forward surface is in sealing contact with the valve seat.

While these types of butterfly valves are satisfactory for low pressures, the problem of keeping sufficient pressure between the valve disc and the valve seat so as to prevent leakage at very high fluid pressures, without scoring the surface of the valve disc or the surface of the sealing ring during the turning process, is a very difficult problem. In this invention, as in the related patent and application, the valve disc is arranged to be moved parallel to its face away from the seat, before the stem turns the valve disc to open the valve. Thus, there is no sliding contact and no friction between the valve disc and the valve seat while it is being turned, and there can be no physical damage to either the disc or the valve seat by the turning operation. Of course, when the valve is to be closed, it is first rotated so its plane is parallel to the plane of the valve seat and then it is moved horizontally so that any desired force can be applied to the disc to make a seal which will prevent leakage at extremely high fluid pressures.

The feature that is important in this invention as it was in the previously mentioned patent and application, is that one continuous motion of axial translation of the valve stem carries out sequentially the two operations which are needed to open or to close the valve. The invention lies in the features of these two cam mechanisms.

SUMMARY OF THE INVENTION

It is a primary object of this invention to provide a high pressure butterfly type valve in which the operation of turning a valve stem control shaft serves to translate axially the valve stem and to sequentially carry out two operations related to the valve disc assembly. The first of these is a motion of translation of the valve disc parallel to itself away from the seat and toward the stem and the second operation is the rotation of the stem (and the valve disc with it) through an angle of 90 degrees, to fully open the valve. In the closing operation, the steps are reversed and the two functions are again carried out sequentially in a selected order by a simple continuous axial movement of the stem.

While the physical construction of the valve is similar in a number of respects to the valve constructions described in the above-mentioned patent and application, the novelty of this invention lies in the design of the disc assembly and the translation cam mechanism of the disc as well as in the turning or rotating cam which serves to rotate the stem through a selected angle.

This invention is directed toward a type of butterfly valve which has improvements making it adaptable for use in high-temperature, high-pressure applications. In the U.S. Pat. No. 3,627,259, a unique cam seal butterfly valve is disclosed in which the valve disc is moved toward and away from the valve seat and when moved away from the valve seat, the disc can be rotated to fully open the valve.

In a butterfly valve, it is important that the disc be supported securely to the stem so as to prohibit the possibility of movement of the disc relative to the stem by the effect of fluid flow through the valve. When high velocity fluid flows are encountered, any possible movement of the valve disc can result in flutter, which can soon damage the valve, resulting in a substantially reduced useful valve life. The present invention is directed toward a means of coupling the valve stem and valve disc assembly in such a way as to allow the disc to be displaced relative to the stem and subsequently to be rotated with the stem, but at the same time, in a manner such that the disc is securely supported to the stem to substantially eliminate the possibility of flutter of the valve disc relative to the stem under high flow rates.

In the present invention the construction of the body of the valve disc assembly by means of which it is attached to and supported by the valve stem, is such as to hold the disc body rigidly, while permitting a traverse in a direction perpendicular to the plane of the valve disc, without play in any direction of movement, thus providing an improved valve which can be more effective in controlling very high pressure fluids and still maintain the simple butterfly type construction.

BRIEF DESCRIPTION OF THE DRAWINGS

These and other objects and advantages of this invention and a better understanding of the principles and details of the invention will be evident from the following description taken in conjunction with the appended drawings, in which:

FIG. 2A is taken across the plane 2A—2A of FIG. 2.

2, 2A, and 3 illustrate a first of the two cam systems employed in this invention.

Figure 6:
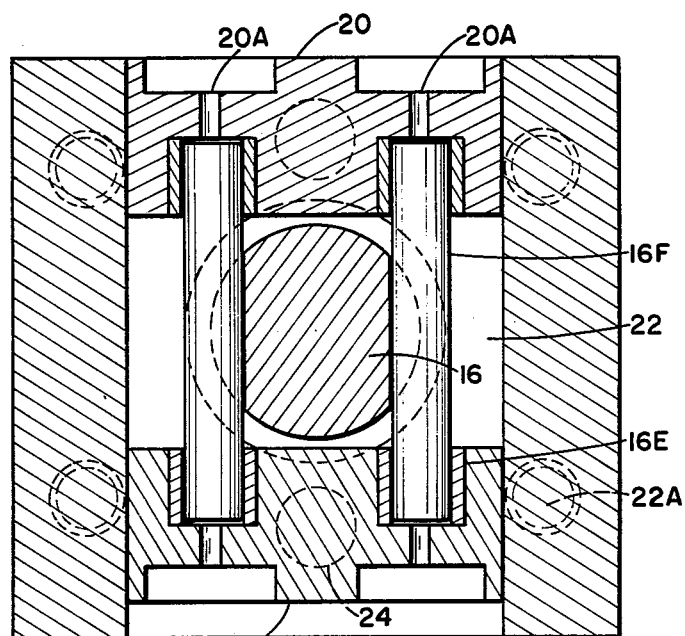

FIGS. 4, 5, and 6 are three views illustrating the construction of the second cam system of this invention, which is for the purpose of rotating the valve stem through a selected angle while it is being translated.

Figure 9:
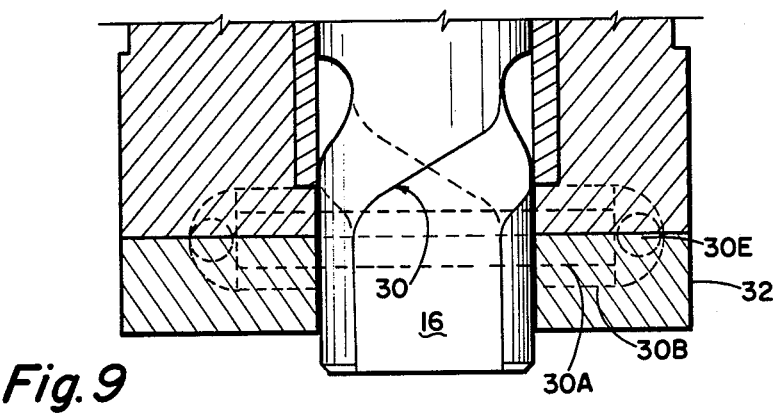
Figure 7:
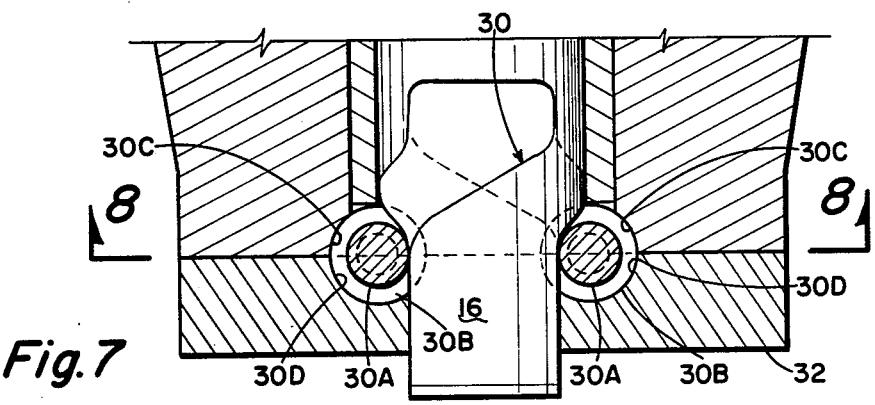
Figure 8:
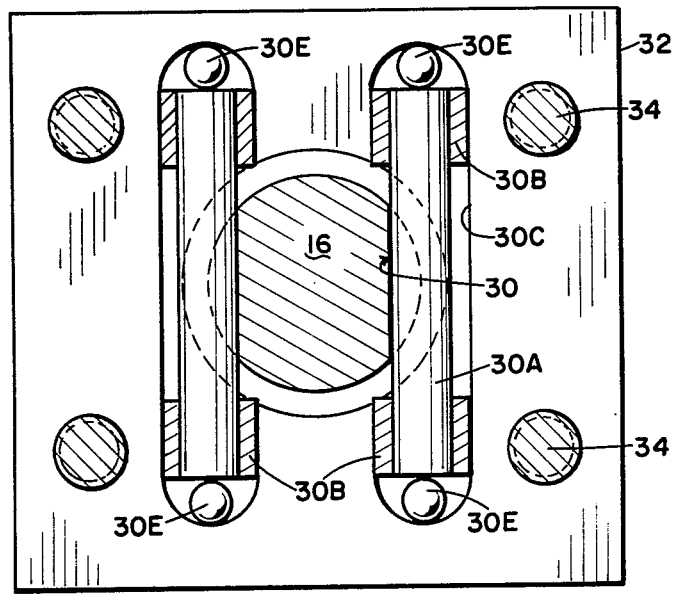

FIGS. 7, 8, and 9 represent views of a modified type of cam and roller construction of the stem-turning cam assembly of this invention.

Figure 11:
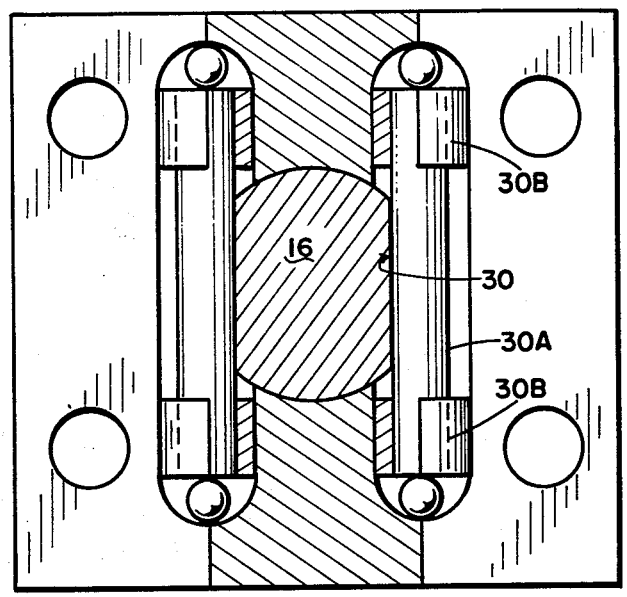
Figure 10:
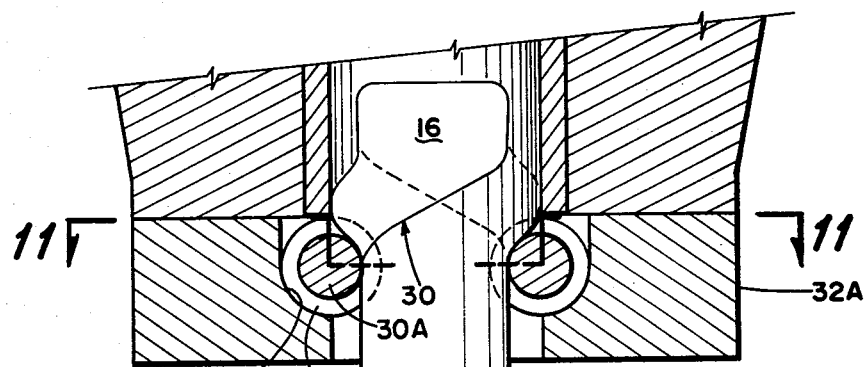
Figure 12:
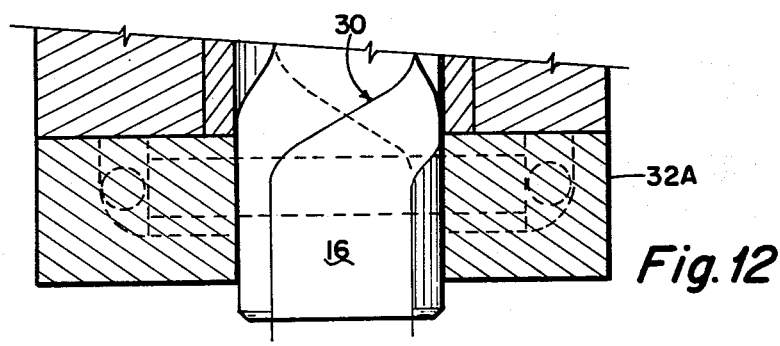

FIGS. 10, 11, and 12 show three views of another embodiment of the cam and roller system which serves to rotate the valve stem while being translated.

DESCRIPTION OF THE PREFERRED EMBODIMENT

Figure 1:
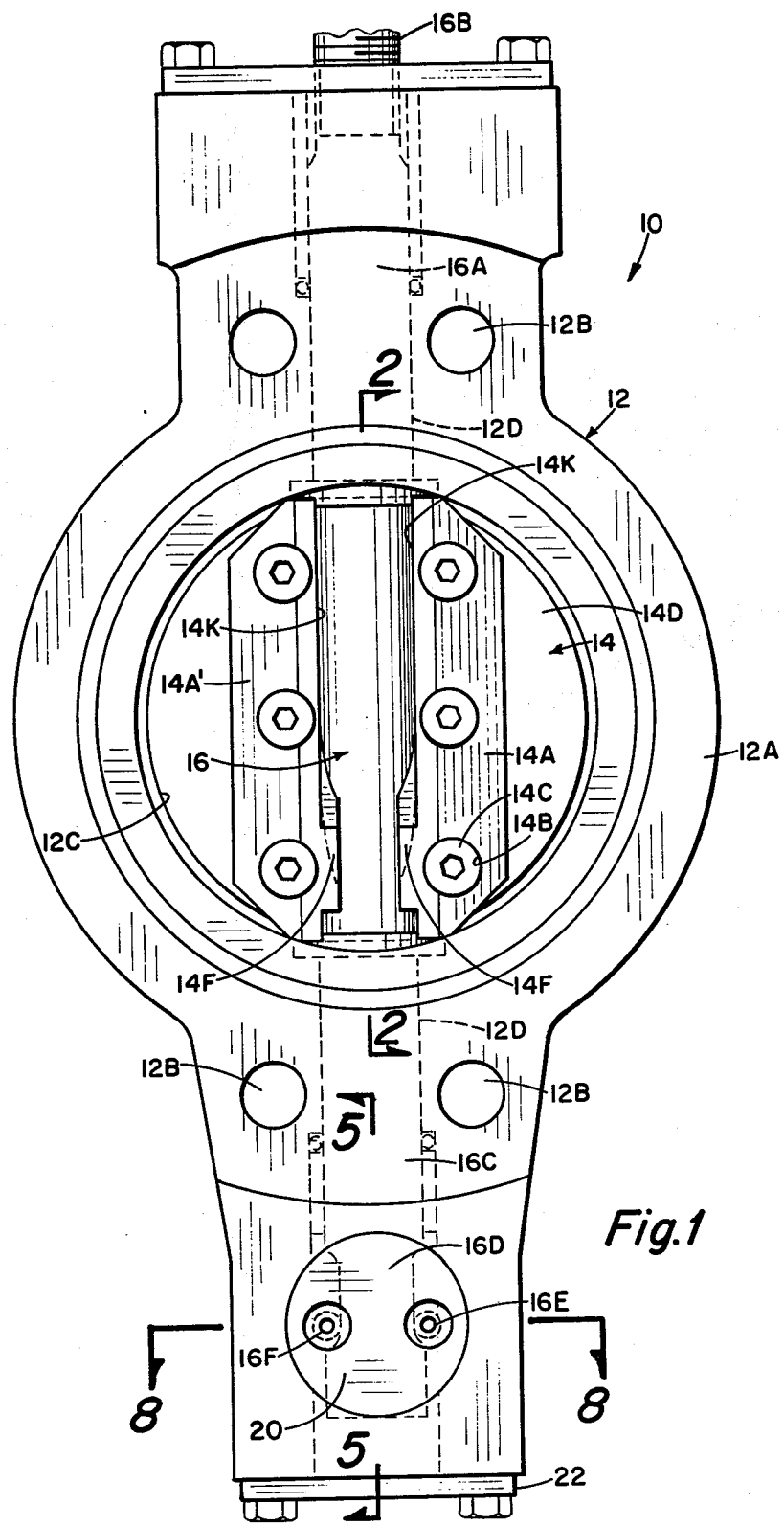
FIG. 1 is a schematic elevational view of the valve from the backward facing surface of the disc.
Figure 2:
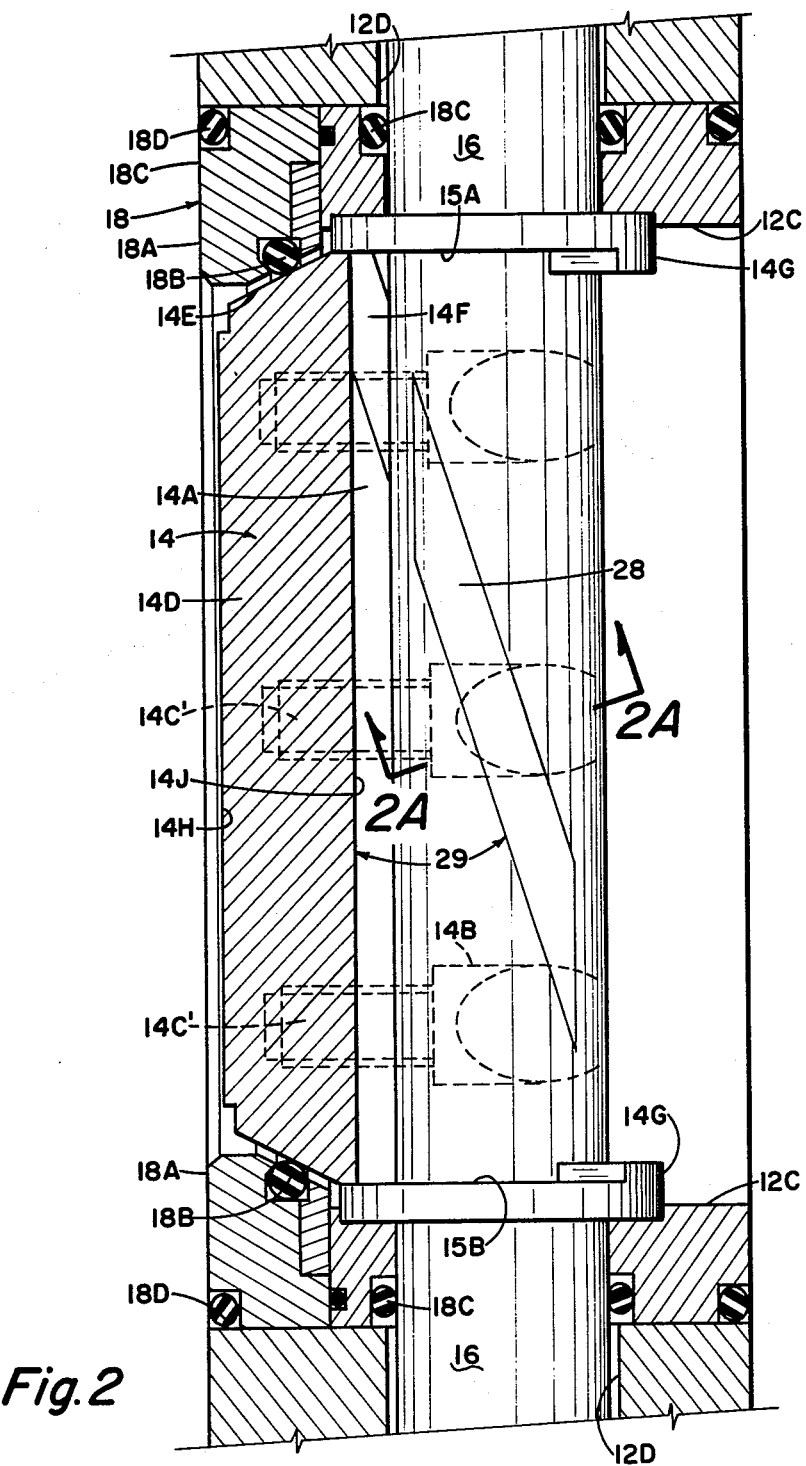
FIG. 2 is a cross-section through the valve disc assembly, valve seat, and valve stem taken across plane 2—2 of FIG. 1.
Figure 3:
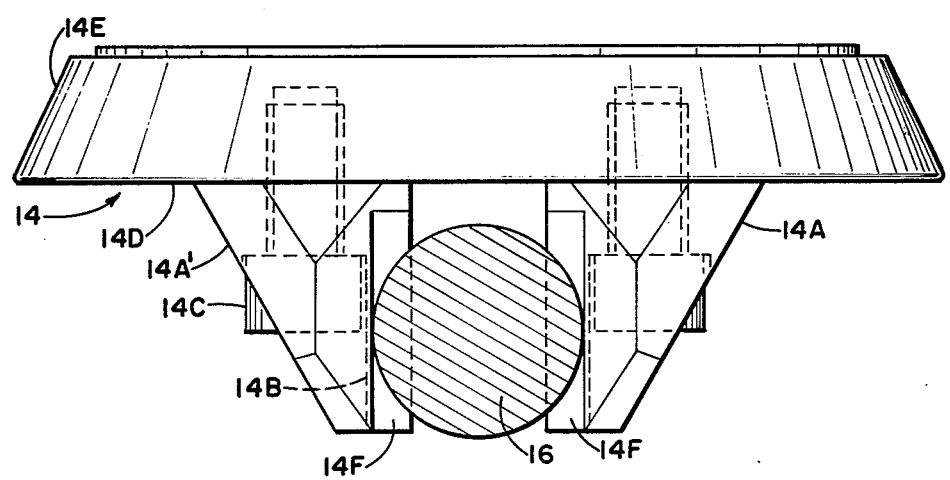
FIG. 3 is a view of the valve disc assembly taken in a plane perpendicular to the axis of the valve stem. FIGS.

Referring now to the drawings, and in particular to FIGS. 1, 2, and 3, FIG. 1 shows an elevational view of the rearward side of the valve that faces upstream of the flow. It is indicated generally by the numeral 10. Numeral 12 indicates generally the body of the valve which has a circular flow channel 12C, the axis of which is perpendicular to the drawing. Numeral 14 indicates generally the valve disc structure which is more clearly shown in FIGS. 2 and 3. It comprises a circular disc 14D having a front face 14H downstream of the flow and a rearward face 14J. As shown in FIGS. 2 and 3, the valve disc assembly comprises the disc 14D and a body portion by which the disc is held to the stem, which includes two wall structures 14A & 14A'. These are similar in construction and are held to the back of the disc by a plurality of bolts 14C so as to securely attach the disc to the body portion. The two wall internal faces are parallel and spaced apart such as to fit without play the diameter of the valve stem shown in cross-section in FIG. 3, as will be explained later.

There are two cams 28 provided which will cause the disc assembly to move along its own axis closer to or farther away from the valve stem 16, so that the sidewalls are held tightly to but can slide along the outer surface of the valve stem. There are two rings 14G which encircle the valve stem and provide an upper surface 15A and a lower surface 15B between which the body portion and walls of the disc assembly are held and can slide axially of the disc. Thus the disc body is held securely with minimum play so that the disc is at all times tightly held to the stem and cannot vibrate or resonate, or flutter, due to the high velocity flow of liquid over its surface.

Referring back to FIG. 1, there are two valve stem openings 12D in the valve body—a top opening and a bottom opening, which are coaxial and through which the valve stem can be inserted. Conventional means (as in FIG. 4) are provided for sealing the valve stem within the valve stem opening. These are fully illustrated in the U.S. Pat. No. 3,627,259 which is entered into this application by reference and need not be further described.

The bottom end of the body is covered by a plate 22 which is held tightly to the body by means of bolts 22A so as to seal out dirt and moisture. Conventional seals, of course, prevent leakage of fluid from the flow channel up or down along the stem to the atmosphere. At the top of FIG. 1 there is shown a section 16B of the valve stem which is threaded. This is for the purpose of translating the stem along its own axis which is fully explained in U.S. Pat. No. 3,627,259.

There are four holes 12B shown in FIG. 1, and the diameter of the body on both sides is of a maximum diameter which will lie within the bolt circle of the flanges between which the valve will be placed. The four bolt holes provide vertical alignment for the valve. With a proper gasket on the surface 12A and the tension of the bolts drawing the two flanges tightly against opposite sides of the body, there will be no leakage of high pressure fluid along the surface 12A or along the flanges.

The lower portion of the body contains the second cam mechanism which cooperates with the cams on the bottom portion of the valve stem. This will be described in detail in connection with FIGS. 4, 5, and 6.

The back view of the valve disc assembly 14 as shown in FIG. 1 and the mounting bolts 14C within counterbored holes 14B securely hold the two body portions or wall portions 14A to the back of the disc. A cam mechanism is shown cut into the outer surface of the cylindrical valve stem, which will be explained further in connection with FIGS. 2 and 2A.

In most butterfly valves the disc seal surface, which seats against the valve seat, is generally of a spherical shape, so that it can be rotated about the stem axis into and out of sealing contact with the seat, and always remain at a fixed distance from the axis of the valve stem. In this valve the disc seating surface 14E is a truncated conical surface which seals against a conventional seal ring 18B, which is held in a properly shaped and sized annular channel in the sealing surface of the seal ring 18. Seal ring 18 is removable and when assembled is sealed by means of 18C and 18D between the shaft of the valve stem 16 and the plane of the pipe flange which is pressed against the surface 18C of the seal ring.

It is clear, therefore, that this valve disc cannot be seated by just simple rotation. Furthermore, in order to seal against high pressure fluids, the internal pressure in the seal member 18B must be higher than that in the fluid. This higher pressure can be provided by moving the valve disc farther into the tapered seat of the seal ring 18, further compressing the seal ring. As previously described, the valve disc and body assembly is adapted to partially surround the valve stem and to be guided so that it can slide parallel to itself closer to or farther away from the axis of the valve stem.

Figure 2A:
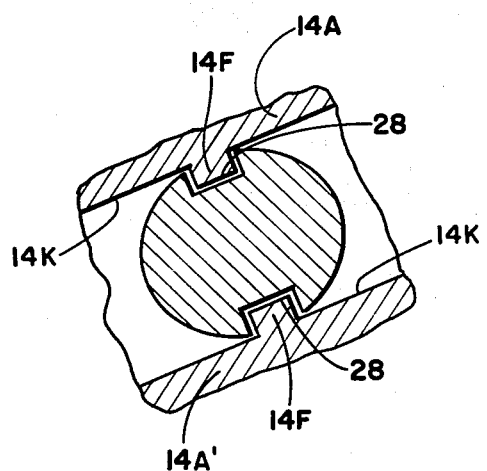
FIG. 2A is a detailed view of the cam system which serves to translate the valve disc parallel to its face.

The first cam system is shown in FIG. 2. This comprises a rectangular groove or channel 28. There are two of these channels as shown in FIG. 2A, each one identical and both are coplanar, and the common plane of the cam channels intersects the axis of the stem by a selected acurate angle 29.

As shown in FIGS. 1, 2, and 3, there is a portion of the surface of each of the wall members of the body of the valve disc indicated as 14F which are rectangular ridges formed in the sidewalls 14K of the body. As shown in FIG. 2A, the dimensions of the rectangular ridges or cam followers, if the groove or channel is called a cam, will, as the valve stem is lifted, slide upwardly in the cam grooves, as the stem is moved down, and thus push the valve disc forward into tight contact with the sealing member 18B.

Conversely, when the valve stem is lifted, these cam followers 14F will move backwardly, pulling the valve disc away from the valve seat until there is enough clearance so that the assembly of valve stem and valve disc and body can be rotated about the stem axis without sliding contact with any part of the valve disc against the seating surface. Thus, by a simple axial motion up or down, the valve disc can be caused to move inwardly or outwardly, backwardly or forwardly as desired. This cam mechanism might be called the translation cam since its principal purpose is to provide a means for translating the valve disc parallel to itself by a selected small distance before the valve disc and valve stem are rotated.

Referring now to FIGS. 4, 5, and 6, there are shown three enlarged views of the bottom portion of FIG. 1. In particular are shown two circular plugs 20 which fit at each end of a corresponding circular bore 20A designed to hold them securely without play. Each of these plugs is held securely in alignment by means of a large cylindrical alignment pin 24, attached to a plate 22 which covers the lower end of the valve body and is held tightly thereto by means of bolts 22A.

So far what has been described is shown more clearly in FIG. 5. A cross-section through the plane 4—4 is shown in FIG. 4, including the alignment pins and bottom plate and bolts. On the lower end of the valve stem 16 is a second cam system called a turning cam 16D. The purpose of this cam is to rotate the stem through a selected angle (90°) as the stem is lifted or lowered. Actually, there are two identical cams displaced 180° around the stem. Starting with two flats 16G, there is a curved cam portion 16K leading to the position of flats 16H which are at 90 degrees to the flats 16G. Two horizontal, parallel, spaced rollers 16F in proper bearings 16E are held within the circular plugs rigidly to the body of the valve. When the valve stem is lifted or lowered, the rollers which start, for example, on the flat portion 16G force the stem to rotate following the curved groove portion 16K to the other flat portion 16H, or vice versa. In other words, pressure of the rollers against the edges of the curved cam portion 16K provide a torque for rotating the stem as the result of the axial translation.

For the valve stem shown in FIG. 4, for example, lifting the valve stem will cause it to rotate, so that the flat portion 16H shown in the plane of the drawing will be turned 90 degrees, until its plane will be perpendicular to the drawing. Of course, correspondingly, the flat surfaces 16G which are now perpendicular to the plane of the drawing will be rotated until they are in the plane of the drawing. The cam surface 16G shown in FIGS. 4, 5, and 6 has an extended planar portion above the curve cam 16K and a shortened flattened portion below the curved portion of the cam.

The cams illustrated in FIGS. 7, 8, and 9 and in FIGS. 10, 11, and 12 show a much shortened upper flat portion, which is not really flat at all as shown in FIG. 9, but just simply provides a semi-cylindrical slot across the shaft. Extending the flat out farther would then make it similar to the cams of FIGS. 4, 5, and 6. The important thing, however, in all of these cams, in these nine figures, is that there is a short portion of curved cam surface 16K (FIG. 4), the cross-section of which is approximately a semi-cylindrical surface of the same diameter as the rollers. Each of these is similar to a quarter of a turn of a thread on a rod, except that there are two identical curved portions, each 180 degrees apart, on the valve stem. Each of the rollers exerts its own torque to rotate the valve stem.

The main difference between FIGS. 4, 5, and 6 and FIGS. 7 through 12 lies in the manner of providing seats for the rollers. There must be two cylindrical seats with axes parallel and spaced a precise distance. The diameter of the seats must be equal to the outer diameter of the bearings within which the rollers turn, and there must be minimum play in all of these features to minimize the possible flutter or vibration of the valve stem and the valve disc.

Referring to FIG. 7, there is shown an assembly in which the cam roller seats are cut as a semi-cylindrical groove 30D, with linear axes in a cover plate 32. The remainder of the roller seats are cut into the main body portion of the valve 30C. Referring to FIG. 8, a type of thrust bearing 30E which is a simple ball is shown which provides a thrust between the ends of the rollers and the end of the seating channels cut into the bottom plate and to the bottom end of the body. It will be recalled that in FIGS. 4, 5, and 6 the thrust mechanism on the roller comprises the bottom of two bored openings on the inner faces of the two cylindrical plugs 20. Very little needs to be said about the types of rollers, the proper metal and heat treatment, etc., since all of this art is well known. As has been said, the main difference lies in the manner in which the seating of the rollers and bearings is provided and how these seats are machined since that is one of the important problems. FIGS. 7, 8, and 9 clearly show that the seat which supports the bearings is partly cut into the bottom plate 32 covering the end of the body and partly into the bottom end of the body itself.

In FIGS. 10, 11, and 12, the entire seat is cut into the bottom plate 32A, which might provide a simpler machining design than that of FIGS. 7, 8, and 9.

What has been described is an improved type of butterfly valve for use in conjunction with very high pressure fluids for providing adequate sealing under conditions of pressure and temperature and providing a long life for the sealing surface and the sealing ring. Since there are no sliding movements between the sealing surfaces, there is consequently minimum wear on them. A single means is provided for translating the valve stem along its axis, which controls the opening and closing of the valve.

Consider the valve closed. The operation of opening the valve starts with upward movement of the valve stem. This causes the first cam to pull back on the valved disc assembly, which separates the seal disc from the valve seat. When the disc has moved back sufficiently, the valve stem starts to turn, and the valve disc assembly with it. When the turn of 90° is completed, the valve is open. Reversing the stem motion causes the reverse operations to take place.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A valve comprising:
    (a) a body having a flow passageway therethrough defined in part by an annular valve seat and having upper and lower coaxial stem openings therein;
    (b) a valve disc assembly positioned in said flow passageway and movable between a closed and an opened position, the valve disc having a forward surface having a peripheral sealing surface and a rearward surface having a body portion attached thereto and having two vertical wall portions, spaced apart and parallel;

(c) a cylindrical valve stem axially and rotatably positionable and sealed in said stem openings in said body, the stem being received between said disc body wall portions;

(d) at a selected position along the portion of said stem which lies within said flow passageway are two cam channels cut in the surface of said stem, one on each side of said stem in contact with said disc body walls, said cam channels in a common plane, which intersects the axis of said stem at a selected acute angle;

(e) two rectangular cam follower ridges adapted to slide in said cam channels, one on each of the surfaces of said walls at said selected acute angle, whereby when said stem is moved axially with respect to said disc assembly, the plane of said disc will move closer to or farther away from the axis of said stem; and (f) means for axially displacing and rotating said stem whereby said disc may be rotated to an open position wherein flow is permitted to either side of the disc, and to a closed position wherein flow is blocked.

2. The valve as in claim 1 wherein said means to translate said stem comprises exterior threads on said stem, gear means with corresponding threads in an axial bore, and thrust bearing means to hold said gear means in fixed axial position to said body.

3. The valve as in claim 2 and wherein said means for rotating said valve stem comprises cam means on said stem and cam follower means on said body, whereby said stem will be rotated in a first direction when said stem is translated in a first direction and will be rotated in the opposite direction when said stem is translated in the opposite direction.

4. The valve as in claim 3 in which said cam means comprises;

at a selected position on said stem, a first pair of at least substantially semi-cylindrical grooves cut into the surface of said stem, at right angles to the axis of said stem, one on each of the opposite sides of said stem;

at a position displaced axially a selected distance from said first pair of substantially semi-cylindrical grooves, a second similar pair cut into the surface of said stem, the axis of said second pair perpendicular to the axis of said stem, but rotated 90° about the axis of said stem from said first pair; and a pair of helical substantially semi-cylindrical grooves one on each side of said stem joining said first and second pairs of grooves.

5. The valve as in claim 4, in which at least one pair of said first and second pairs of grooves are extended axially of said stem to provide parallel substantially flat portions, equally spaced from the axis of said stem.

6. The valve as in claim 4 and including a pair of cam followers, comprising:

a pair of rollers of diameter substantially equal to that of said grooves journaled in bearings supported in the body of said valve;

said rollers parallel to each other and symmetrically positioned on opposite sides of said stem and adapted to simultaneously contact the two opposite grooves.

* * * * *